(12) United States Patent
Cheng et al.

(10) Patent No.: US 9,727,090 B2
(45) Date of Patent: Aug. 8, 2017

(54) PORTABLE ELECTRONIC APPARATUS

(71) Applicants: Inventec (Pudong) Technology Corporation, Shanghai (CN); INVENTEC CORPORATION, Taipei (TW)

(72) Inventors: Yi-Lun Cheng, Taipei (TW); Chih-Kai Yang, Taipei (TW)

(73) Assignees: Inventec (Pudong) Technology Corporation, Shanghai (CN); INVENTEC CORPORATION, Taipei (TW)

( * ) Notice: Subject to any disclaimer, the term of this patent is extended or adjusted under 35 U.S.C. 154(b) by 0 days.

(21) Appl. No.: 15/168,256

(22) Filed: May 31, 2016

(65) Prior Publication Data

US 2017/0153673 A1 Jun. 1, 2017

(30) Foreign Application Priority Data

Nov. 30, 2015 (CN) .......................... 2015 1 0854532

(51) Int. Cl.
*G06F 1/16* (2006.01)
(52) U.S. Cl.
CPC .......... *G06F 1/1662* (2013.01); *G06F 1/1616* (2013.01)
(58) Field of Classification Search
CPC .... G06F 3/0221; G06F 1/1662; G06F 1/1666; G06F 1/1671; G06F 1/1616; G06F 1/1677; G06F 1/1624; G06F 1/1635; G06F 1/1637; G06F 1/1681; G06F 1/1683; G06F 1/263; H01H 13/70; H01H 13/7065; H01H 2223/05; H01H 2223/052; H01H 3/125; H01H 13/10; H01H 13/705; H01H 13/85
USPC ............ 361/679.08, 679.09, 679.11, 679.13, 361/679.21
See application file for complete search history.

(56) References Cited

U.S. PATENT DOCUMENTS 6,314,274 B1 * 11/2001 Kumagai ............ H04M 1/0214
361/679.13

* cited by examiner

*Primary Examiner* — Anthony Haughton
*Assistant Examiner* — Ingrid Wright
(74) *Attorney, Agent, or Firm* — CKC & Partners Co., Ltd.

(57) ABSTRACT

Portable electronic apparatus includes a display component, a base, a keyboard component, and a slidable structure. The display component includes an interlocking structure. The base includes a pivotally-connected portion, pivotally-connected to the display component. The keyboard component disposed on the base can move toward or away from the base. The slidable structure disposed between the base and the keyboard component can slide relative to the base. The slidable structure includes a protruding portion, protruding along a side of the slidable structure away from the base. While the display component is rotated away from the base, the interlocking structure of the display component is actuated by the rotated display component, and drive the slidable structure to slide away from the pivotally-connected portion, moved relative to the base. Subsequently, the first protruding portion of the slidable structure pushes the keyboard component moving away from the base.

10 Claims, 5 Drawing Sheets

Fig. 4B

PORTABLE ELECTRONIC APPARATUS

RELATED APPLICATIONS

This application claims priority to Chinese Application Serial Number 201510854532.6, filed Nov. 30, 2015, which is herein incorporated by reference.

BACKGROUND

Field of Invention

The present disclosure relates to a portable electronic apparatus. More particularly, the present disclosure relates to a portable electronic apparatus with a storable keyboard.

Description of Related Art Nowadays, portable electronic apparatus developed with advance technologies becomes thinner and thinner. Therefore, electronic components installed inside the portable electronic apparatus, such as central processing unit (CPU), hardware disk drive (HDD) . . . etc., also require to be developed much thinner and lighter under thinning tendency, and the electronic components enable to function more powerful. Correspondingly, electronic components with more powerful function may also generate more heat accumulated inside the housing of the portable electronic apparatus. However, the portable electronic apparatus needs to assemble the electronic components more compactly into a limited space within a housing of the portable electronic apparatus, to pursue the thinning and minimizing tendency. That is, a limited space within the housing of the thinning portable electronic apparatus needs to accommodate with more heat-generated components. Furthermore, the crowding heat-generated components may also occupy a reserved space of the housing for installing heat dissipation component. Accordingly, the portable electronic apparatus may need additional space for heat dissipated or heat dissipation component, to aid the portable electronic apparatus exchanging heat with circumstance for dissipating heat accumulated within the housing of the portable electronic apparatus.

Consequently, the available structure of a portable electronic apparatus, as described above, apparently exists with inconvenience and defect, which needs further improvement. To deal with aforesaid problem, practitioners of ordinary skill in the art have striven to attain a solution, still lacks a suitable solution to be developed. Therefore, to deal with aforesaid problem effectively is an important subject of research and development, and also a desired improvement in the art.

SUMMARY

The present disclosure provides a portable electronic apparatus includes a display component, a base, a keyboard component, and a slidable structure. The display component includes an interlocking structure. The base includes a pivotally-connected portion, pivotally connected to the display component. The keyboard component is disposed on the base, and configured to move toward or away from the base. The slidable structure is disposed between the base and the keyboard component, and configured to slide relative to the base. The slidable structure includes at least one protruding portion, protruding along a side of the slidable structure away from the base. While the display component is rotated away from the base, and the portable electronic apparatus is transformed into an open statue, the interlocking structure of the display component is actuated by the rotated display component, and configured to drive the slidable structure to slide away from the pivotally-connected portion, moving relative to the base. Subsequently, the first protruding portion of the slidable structure pushes the keyboard component moving away from the base.

It is to be understood that both the foregoing general description and the following detailed description are by examples, and are intended to provide further explanation of the invention as claimed.

BRIEF DESCRIPTION OF THE DRAWINGS

The disclosure can be more fully understood by reading the following detailed description of the embodiment, with reference made to the accompanying drawings as follows.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

It will be understood that when an element is referred to as being "on" another element, it can be directly on the other element or intervening elements may be present there between. In contrast, when an element is referred to as being "directly on" another element, there are no intervening elements present.

Figure 1:
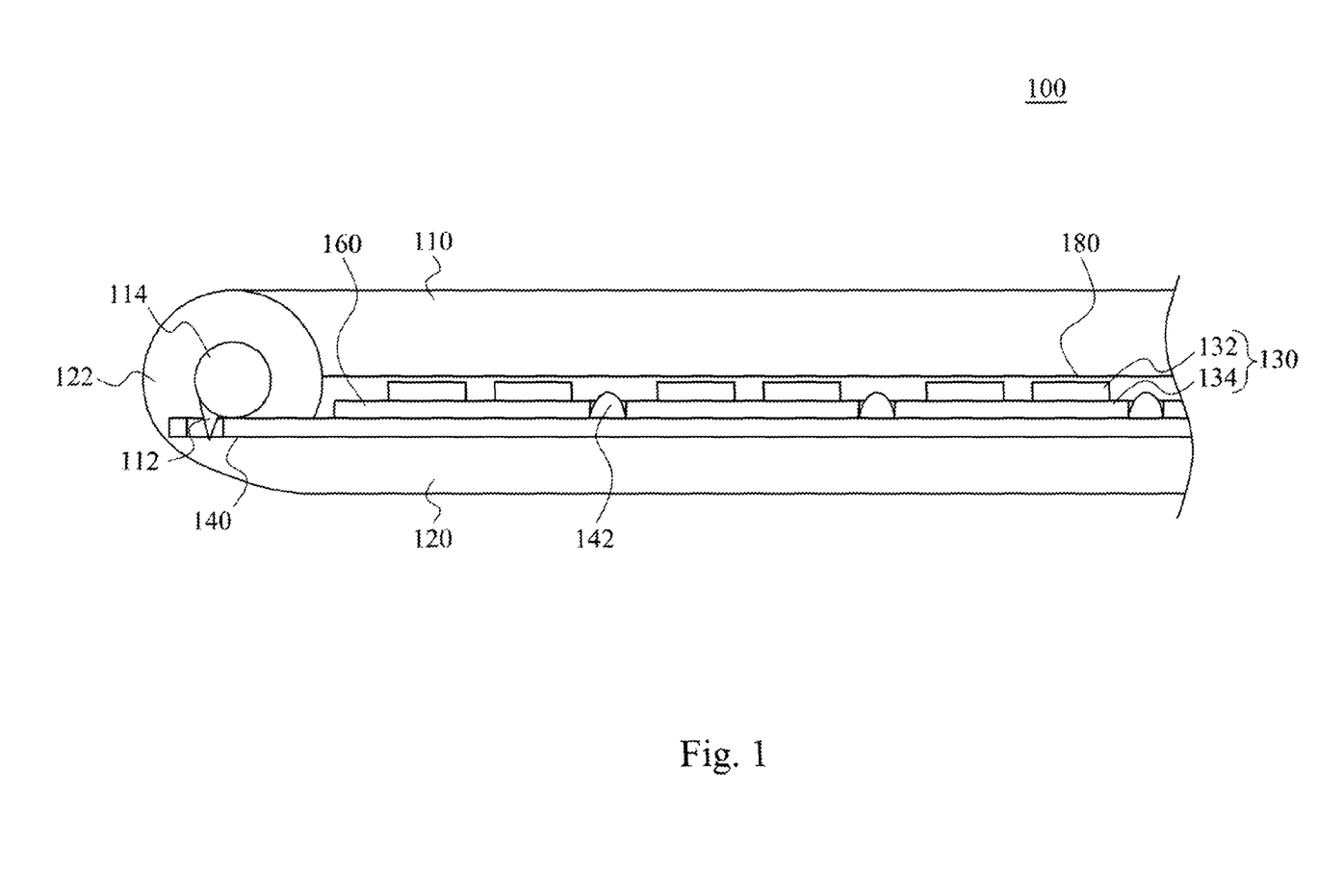
FIG. 1 and FIG. 2 are longitudinal sectional views of a portable electronic apparatus at different statues according to an embodiment of the present disclosure.
Figure 2:
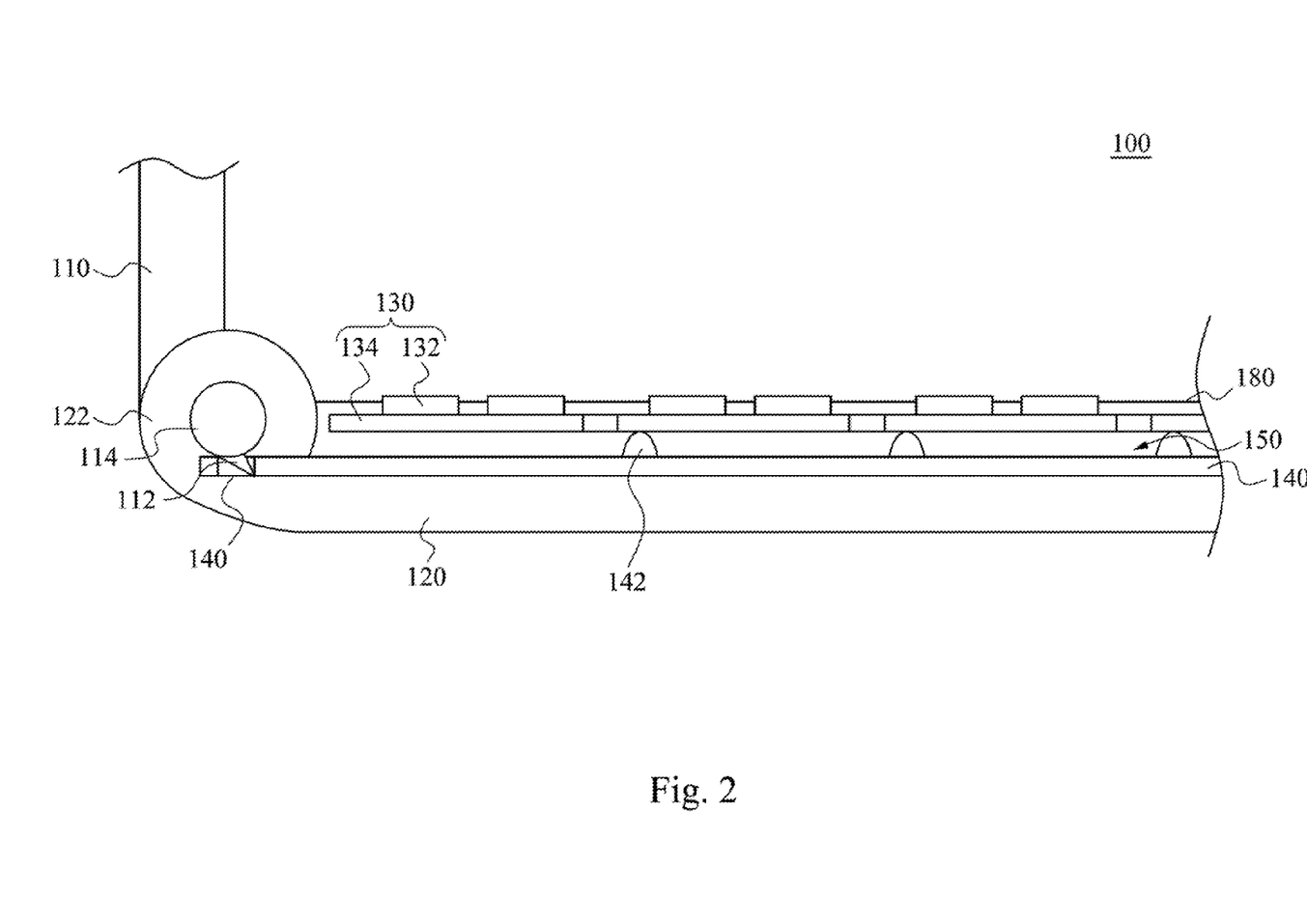

FIG. 1 illustrates longitudinal sectional views of a portable electronic apparatus 100 in a closed statue, in which the display component 110 abuts against a top surface of the base 120, according to an embodiment of the present disclosure. FIG. 2 illustrates longitudinal sectional views of a portable electronic apparatus 100 in an open statue, in which the display component 110 is rotated away from the base 120, according to an embodiment of the present disclosure. As shown in FIG. 1, the portable electronic apparatus 100 includes the display component 110, the base 120, a keyboard component 130, and a slidable structure 140. The display component 110 includes an interlocking structure 112. The base 120 includes a pivotally-connected portion 122, the base 120 is pivotally connected to the display component 110 through the pivotally-connected portion 122. In some embodiments, the display component 110 may further includes a rotating shaft 114, the interlocking structure 112 is inter-linked to the rotating shaft 114. The keyboard component 130 is disposed on the base 120, and configured to move toward or away from the base 120. In some embodiments, the keyboard component 130 may include buttons 132 and base plate 134, which would be described in detail later. In some embodiments, the buttons 132 are disposed on a side of the keyboard component 130 away from the base 120. In some embodiments, the base 120 may have an accommodation space, configured to accommodate the keyboard component 130 inside. The slidable structure 140 is disposed between the base 120 and the keyboard component 130, and the slidable structure 140 slides substantially parallel relative to the base. In some embodiments, the slidable structure 140 may be indirectly or directly inter-linked to the interlocking structure 112. The slidable structure 140 includes at least one protruding portion 142, protruding along a side of the slidable structure 140 away from the base 120.

Referring to the FIG. 2, while the display component 110 is rotated away from the base 120, and the portable electronic apparatus 100 is transformed into the open statue, the interlocking structure 112 of the display component 110 is actuated or drove by the rotated display component 110, and configured to drive the slidable structure 140 to slide away from the pivotally-connected portion 122, moving relative to the base 120. Subsequently, the first protruding portion 142 of the slidable structure 140 may push or drive the keyboard component 130 moved away from the base 120. In some embodiments, while the rotating shaft 114 rotates, owing to the slidable structure 140 is indirectly or directly inter-linked to the interlocking structure 112, the slidable structure 140 can be actuated or drove through the interlocking structure 112. Then, the slidable structure 140 can be slided toward or away from the pivotally-connected portion 122, moving relative to the base 120.

It should be noted that, the structures of the slidable structure 140 and the interlocking structure 112, and the connection relation between the slidable structure 140 and the interlocking structure 112, as shown herein, is only an exemplary, and not intended to limit the present disclosure. For example, the interlocking structure 112 may be a gear set, a connecting rod, a bump structure, or other suitable structure. Furthermore, there can be other structure disposed between the slidable structure 140 and the interlocking structure 112, to link the slidable structure 140 and the interlocking structure 112, such that while the display component 110 is rotated away from the base 120, the display component 110 may drive the slidable structure 140 through the interlocking structure 112 to slide away from the pivotally-connected portion 122, moving relative to the base 120, and then the first protruding portion 142 of the slidable structure 140 may further pushes or drives the keyboard component 130 moved away from the base 120. It should be understood that, the connection relation between the slidable structure 140 and the interlocking structure 112 could be adjusted to actual demand by those skilled in the art without departed from the scope or the spirit of the present disclosure. That is to say, prerequisite of the connection relation between the slidable structure 140 and the interlocking structure 112 is that, the rotated display component 110 can drive or actuate the slidable structure 140 through the interlocking structure 112, to move the slidable structure 140 slided relative to the base 120 for controlling the keyboard component 130 moved toward or away from the base 120.

As shown in FIG. 1, while the display component 110 is abutted against the top surface of the base 120, and the portable electronic apparatus 100 is at the closed statue, the keyboard component 130 can be accommodated inside the accommodation space of the base 120, such that the portable electronic apparatus 100 can be thinner. Referring to the FIG. 2, while the display component 110 is rotated away from the base 120, the rotated display component 110 may drive or actuate the slidable structure 140 through the interlocking structure 112, to move the slidable structure 140 slided away from the pivotally-connected portion 122, so that the first protruding portion 142 of the slidable structure 140 pushes or drives the keyboard component 130 moved away from the base 120 to form a heat dissipation channel 150. Therefore, the colder air from circumstance can enter or be inhaled into a heat dissipation module (not shown) of the base 120. Furthermore, the heat-generated components (not shown) installed inside the base 120 can exchange heat with the cold air inhaled from circumstance or exhale the heated air to circumstance through the heat dissipation channel 150, so as to improve the heat-dissipated efficiency of the portable electronic apparatus 100. Due to the portable electronic apparatus 100 with higher heat dissipation efficiency may release or diffuse heat accumulated inside the portable electronic apparatus 100 properly, so that the portable electronic apparatus 100 may reduce or avoid heat-generated components of the portable electronic apparatus 100, such as a central processing unit, a hardware disk drive or a graphical processing unit etc., being ruined or malfunctioned. That is, the portable electronic apparatus 100 can be thinning, and still operated with improved heat-dissipated efficiency.

Figure 3A:
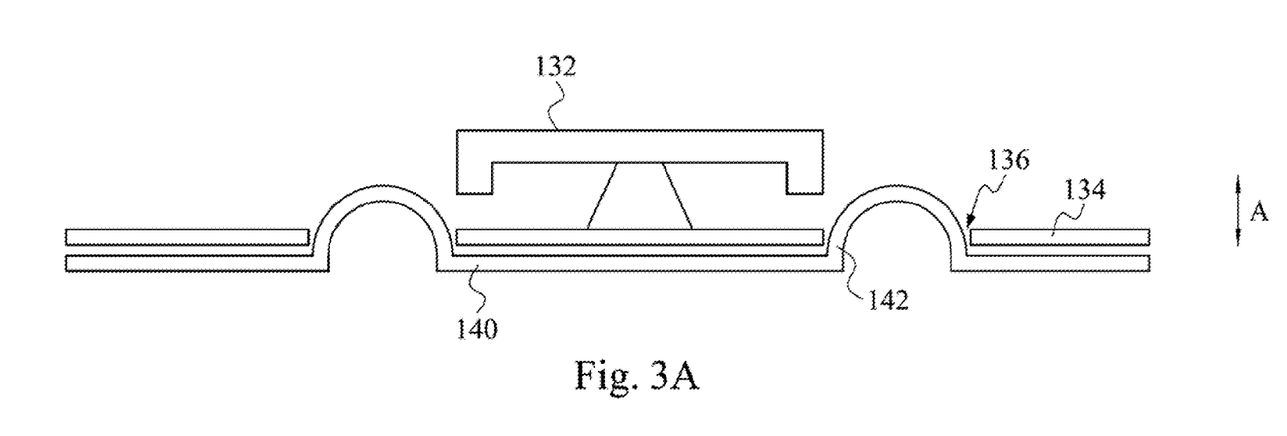
FIG. 3A and FIG. 3B are simplified longitudinal sectional views of a slidable structure, a keyboard component, and a base of a portable electronic apparatus at different statues according to an embodiment of the present disclosure.
Figure 3B:
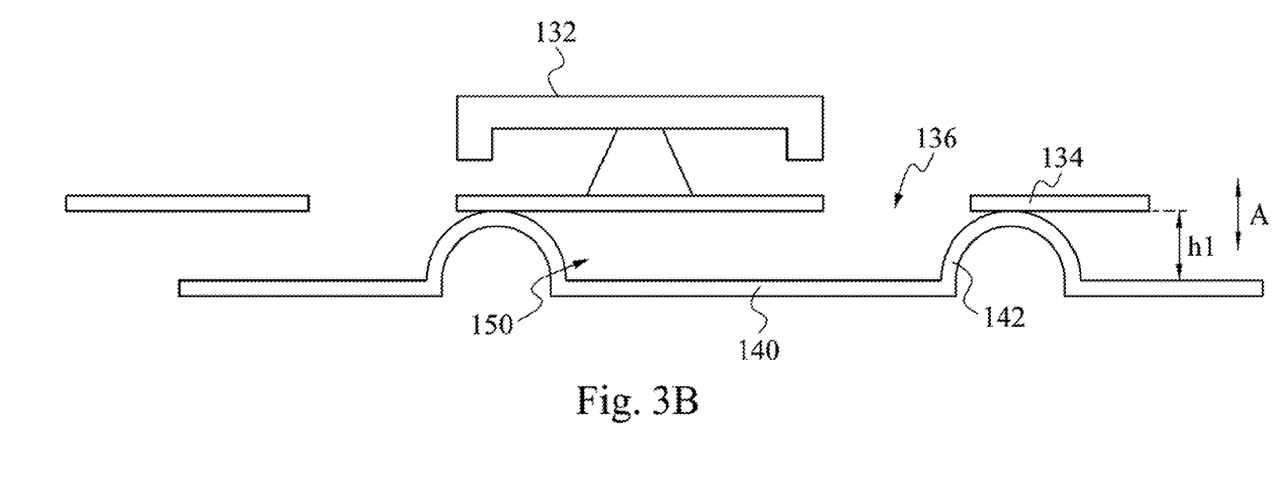

FIG. 3A illustrates a simplified longitudinal sectional view of a slidable structure 140, a keyboard component 130, and a base 120 of a portable electronic apparatus 100 in a closed statue, in which the display component 110 is abutted against a top surface of the base 120, according to an embodiment of the present disclosure. FIG. 3B illustrates a simplified longitudinal sectional view of a slidable structure 140, a keyboard component 130, and a base 120 of a portable electronic apparatus 100 in an open statue, in which the display component 110 is rotated away from the base 120, according to an embodiment of the present disclosure. As shown in FIG. 3A, the keyboard component 130 further includes a base plate 134. The base plate 134 may have at least one through hole 136. Referring FIG. 3A with FIG. 1, while the display component 110 is abutted against the top surface of the base 120, the first protruding portion 142 can be inserted into the through hole 136. In some embodiments, a top surface of the first protruding portion 142 can be protruded, aligned with, or below a top surface of the through hole 136, which is not intended to limit the present disclosure. In some embodiments, a longitudinal sectional view of the first protruding portion 142 may be an arc shaped a triangle or other suitable shape protruding from the base plate 134, which is not intended to limit the present disclosure. That is to say, prerequisite of the first protruding portion 142 is that, while the slidable structure 140 slides relative to the base 120 and the base plate 134, the first protruding portion 142 can be departed from the through hole 136.

Referring to the FIG. 3B and FIG. 2, while the display component 110 is rotated away from the base 120, the first protruding portion 142 is departed from the through hole 136, and moved between the base plate 134 and the base 120 (as shown in FIG. 2). Therefore, the keyboard component 130 can be drove or pushed to move away from the base 120, and the heat dissipation channel 150 is formed the between the base plate 134 and the slidable structure 140, supported by the first protruding portion 142. That is, the cold air can enter or be inhaled into the base 120 through the through hole 136 and the heat dissipation channel 150. In some embodiments, the vertical projection of the button 132 (a button 132 illustrated in FIG. 3A and FIG. 3B as an exemplary) projected along a stacking direction A of the keyboard component 130 and the slidable structure 140 on a surface of the base plate 134, is non-overlapped with the through hole. In some embodiments, while the first protruding portion 142 is moved between the keyboard component 130 and the base 120, a gap formed between the slidable structure 140 and the keyboard component 130 has a height h1. The height h1 would be lesser or equal to a height of the first protruding portion 142 along the stacking direction A.

Figure 4A:
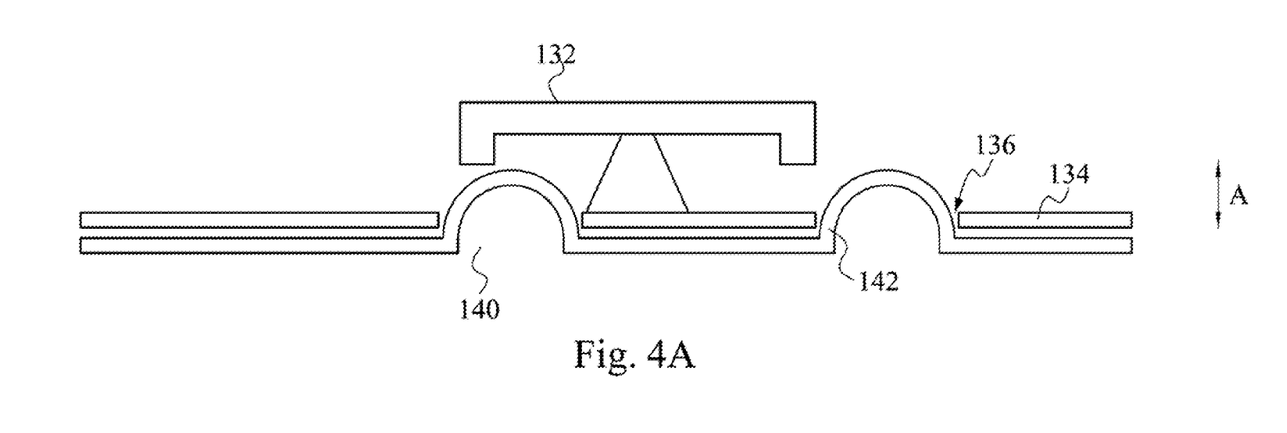
FIG. 4A and FIG. 4B are simplified longitudinal sectional views of a slidable structure, a keyboard component, and a base of a portable electronic apparatus at different statues according to other embodiment of the present disclosure.
Figure 4B:
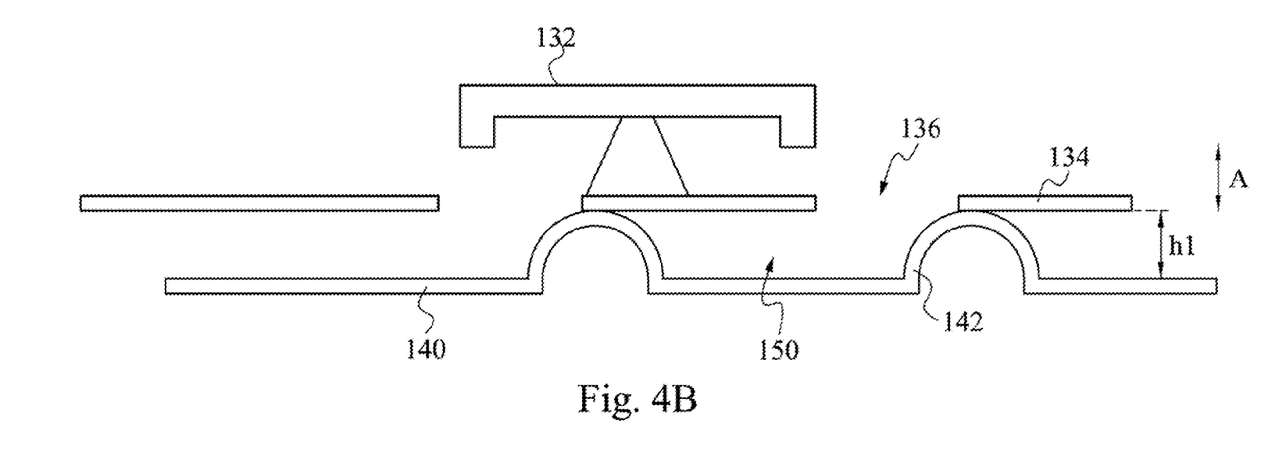

FIG. 4A illustrates a simplified longitudinal sectional view of a slidable structure 140, a keyboard component 130, and a base 120 of a portable electronic apparatus 100 in a closed statue, in which the display component 110 is abutted against a top surface of the base 120, according to another embodiment of the present disclosure. FIG. 4B illustrates a simplified longitudinal sectional view of a slidable structure 140, a keyboard component 130, and a base 120 of a portable electronic apparatus 100 in an open statue, in which the display component 110 is rotated away from the base 120, according to another embodiment of the present disclosure. As shown in FIG. 4A, in another embodiments, the vertical projection of the button 132 (a button 132 illustrated in FIG. 4A and FIG. 4B as an exemplary) projected along a stacking direction A on a surface of the base plate 134, is overlapped with at least part of the through hole 136. In some embodiments, a top surface of the first protruding portion 142 can be protruded, aligned with, or below a top surface of the through hole 136, which is not intended to limit the present disclosure. That is to say, prerequisite of the first protruding portion 142 is that, while the slidable structure 140 is slided relative to the base 120 and the base plate 134, the first protruding portion 142 can be departed from the through hole 136. Although, the cold air or the hot airflowed through the through hole 136 would be lesser, and a path formed between the through hole 136 to the heat dissipation channel would be more winding. Nonetheless, at least part of the through hole covered by the button 132 may reduce or avoid a dust or a foreign matter from circumstance penetrating or invaded the heat dissipation channel 150, in which the dust or the foreign matter can be hardly removed from the heat dissipation channel 150.

In addition, the portable electronic apparatus 100, as shown in FIG. 3A to FIG. 4B, only needs a first protruding portion 142 departed from the through hole 136 to be abutted against the base plate 134, the first protruding portion 142 penetrating between the base plate 134 and the base 120 can drive the keyboard component 130 moved away from the base 120, and formed the heat dissipation channel 150 between the base plate 134 and the base 120. Therefore, the portable electronic apparatus 100 can be normally operated with at least one first protruding portion 142 penetrating between the base plate 134 and the base 120. Furthermore, the first protruding portion 142 can be disposed at a dummy region of the keyboard component 130 without any button 132. That is, a prerequisite of the first protruding portion 142 is that, the heat dissipation channel 150 can be formed through the first protruding portion 142 supporting between the base plate 134 and the slidable structure 140.

Figure 5A:
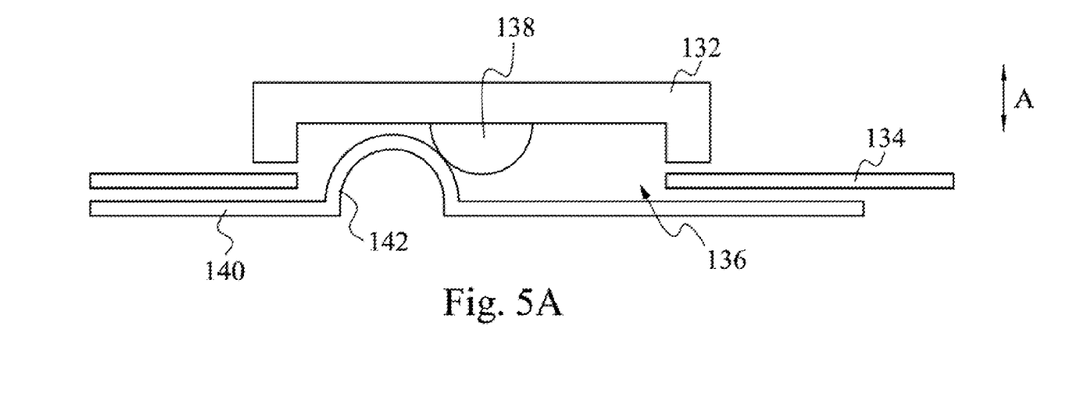
FIG. 5A and FIG. 5B are simplified longitudinal sectional views of a slidable structure, a keyboard component, and a base of a portable electronic apparatus at different statues according to other embodiment of the present disclosure.
Figure 5B:
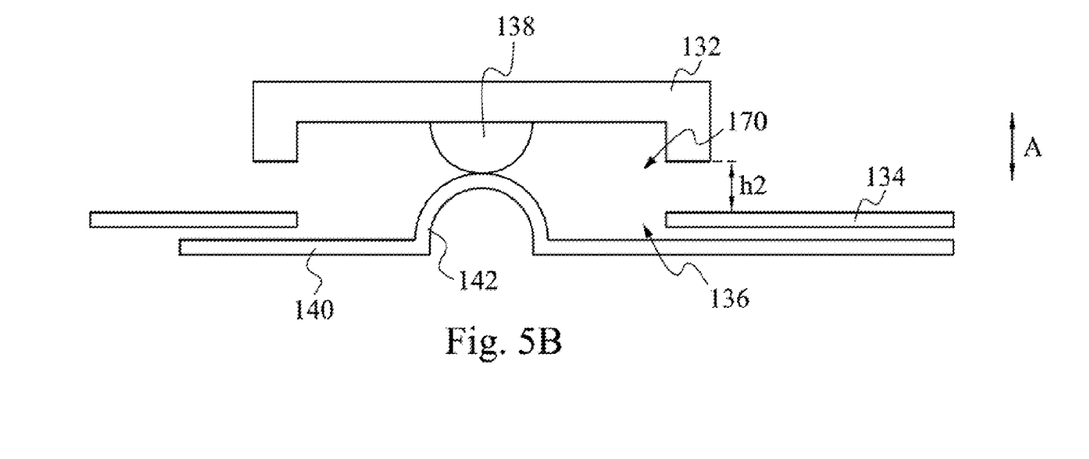

FIG. 5A illustrates a simplified longitudinal sectional view of a slidable structure 140, a keyboard component 130, and a base 120 of a portable electronic apparatus 100 in a closed statue, in which the display component 110 is abutted against a top surface of the base 120, according to other embodiment of the present disclosure. FIG. 5B illustrates a simplified longitudinal sectional view of a slidable structure 140, a keyboard component 130, and a base 120 of a portable electronic apparatus 100 in an open statue, in which the display component 110 is rotated away from the base 120, according to other embodiment of the present disclosure. As shown in FIG. 5A, the keyboard component 130 further includes buttons 132 (a button 132 illustrated in FIG. 5A and FIG. 5B as an exemplary), and a base plate 134. The base plate 134 may have through holes 136 (a through hole 136 illustrated in FIG. 5A and FIG. 5B as an exemplary). Each of the buttons is corresponded with one of the through holes. In some embodiments, the slidable structure 140 may include first protruding portions 142. each of the first protruding portions 142 is accessed into one of the corresponded through holes, and the first protruding portions are configured to contact with one of the buttons corresponded with the through hole.

In some embodiments, the vertical projections of the buttons 132 projected along the stacking direction A of the keyboard component 130 and the slidable structure 140 on a surface of the base plate 134, are overlapped with at least part of the through hole 136. On the other hand, the vertical projection of the button 132 projected along the stacking direction A on a surface of the through hole 136, is covered at least part of the through hole 136. Therefore, at least part of the through hole covered by the button 132 may reduce or avoid a dust or a foreign matter from circumstance penetrating or invaded between the slidable structure 140 and the base plate 134, in which the dust or the foreign matter can be hardly removed.

As shown in FIG. 5B, in some embodiments, each of the buttons 132 may include a second protruding portion 138, disposed on a surface of the button 132 facing toward the slidable structure 140. While the slidable structure 140 slides away from the pivotally-connected portion 122, moving relative to the base 120 (as shown in FIG. 2), the second protruding portion 138 is abutted against the first protruding portion 142, and relatively slides along a surface of the first protruding portion 142. Subsequently, the second protruding portion 138 may drive or interlink the button 132 moved away from the slidable structure 140 along the stacking direction A.

A heat dissipation channel 170 is formed between the buttons 132 and the slidable structure 140 through the first protruding portion 142 abutted against the second protruding portion 138, so that a gap formed between the button 132 and the base plate 134 has a height h2. As a consequence, the cold air can enter or be inhaled into the base 120 through the heat dissipation channel 170, or the hot air may be exhaled reversely along the same path, such that the heat-dissipated efficiency of the portable electronic apparatus 100 may be improved. Owing to the portable electronic apparatus 100 described herein, only make the buttons 132 move, and each of the buttons is corresponded with one of the first protruding portion, compression strokes of the buttons may become more homogeneous. In the meanwhile, in some embodiments, a sensing circuit of the button may be installed on the corresponded first protruding portion 142, to sense an electrical signal corresponded to motion of the button 132.

In some embodiments, while the first protruding portion 142 of the slidable structure 140 is accessed or inserted into the corresponded through holes 132, or between the corresponded button 132 and the base 120, respectively, the first protruding portion 142 is abutted against the second protruding portion 138. Therefore, the buttons 132 can be assembled more compactly, to make the portable electronic apparatus 100 become thinner and lighter. In some embodiments, the first protruding portions 142 of the slidable structure 140 accessed or inserted into the corresponded through holes 132 may not be abutted against the second protruding portions 138.

It should be noted that, the arrangement of the slidable structure 140, the keyboard component 130 and the base 120, as shown in FIG. 3A to FIG. 56, are only exemplary, and not intended to limit the present disclosure, the base plate 134 and/or the buttons 132 may contact the first protruding portion 142, to be drove moved away from the base 130. It should be understood that, the arrangement of the slidable structure 140, the keyboard component 130 and the base 120 could be adjusted to actual demand by those skilled in the art without departed from the scope or the spirit of the present disclosure. That is to say, prerequisite of the arrangement of the slidable structure 140, the keyboard component 130 and the base 120 is that, the first protruding portion 142 can produce a heat dissipation channel 150, 170 between the keyboard component 130 and the slidable structure 140, to let the cold air enter the base 120 through the heat dissipation channel.

Referring to FIG. 2, in some embodiment, the portable electronic apparatus 100 may further include a stopper portion 180. In some embodiments, the stopper portion 180 may be disposed on the keyboard component 130. The stopper portion 180 has openings. While the keyboard component 130 moves away from the base 120, each of the buttons 132 is protruded outside the stopper portion 180 from one of the corresponded openings. In some embodiments, the stopper portion 180 can be other arrangements guiding the keyboard component 130 moved away from the base 120, for example, a guiding trench or other suitable guiding design.

Summarized from the above, the present disclosure provides a portable electronic apparatus includes a display component, a base, a keyboard component, and a slidable structure. The display component includes an interlocking structure. The base includes a pivotally-connected portion, pivotally connected to the display component. The keyboard component is disposed on the base, and configured to move toward or away from the base. The slidable structure is disposed between the base and the keyboard component, and configured to slide relative to the base. The slidable structure includes at least one protruding portion, protruding along a side of the slidable structure away from the base. While the display component is rotated away from the base, and the portable electronic apparatus is transformed into an open statue, the interlocking structure of the display component is actuated by the rotated display component, and configured to drive the slidable structure to slide away from the pivotally-connected portion, moved relative to the base. Subsequently, the first protruding portion of the slidable structure pushes the keyboard component moved away from the base. Therefore, the portable electronic apparatus can be thinning in which the keyboard component accommodated inside the base, and having greater heat-dissipated efficiency in which the portable electronic apparatus is working in the open statue.

Although some embodiments of the present disclosure and their advantages have been described in detail, it should be understood that various changes, substitutions, and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, fabricate, composition of matter, means, methods, and steps described in the specification. As one of ordinary skill in the art will readily appreciate from the disclosure of the present disclosure, processes, machines, fabricate, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, fabricate, compositions of matter, means, methods, or steps.

What is claimed is:

1. A portable electronic apparatus, comprising:
    a display component, comprising an interlocking structure;
    a base, comprising a pivotally-connected portion, the pivotally-connected portion pivotally connected to the display component;
    a keyboard component, disposed on the base, and configured to move toward or away from the base, wherein the keyboard component further comprises a plurality of buttons disposed on a side of the keyboard component away from the base, the keyboard component further comprises a base plate having at least one through hole; and
    a slidable structure disposed between the base and the keyboard component, and configured to slide relative to the base, wherein the slidable structure comprises at least one first protruding portion, protruding along a side of the slidable structure away from the base, wherein
    when the display component is rotated away from the base, and the portable electronic apparatus is transformed into an open statue, the interlocking structure of the display component is actuated by the rotated display component, and configured to drive the slidable structure to slide away from the pivotally-connected portion, moved relative to the base, subsequently, the first protruding portion of the slidable structure pushes the keyboard component moving away from the base,
    when the display component is abutted against a top surface of the base, the first protruding portion is inserted into the through hole,
    when the slidable structure slides away from the pivotally-connected portion, the first protruding portion is departed from the through hole, and moved between the base plate and the base, to drive the keyboard component moved away from the base.

2. The portable electronic apparatus of claim 1, wherein a vertical projection of each of the buttons projected along a stacking direction of the keyboard component and the slidable structure on a surface of the base plate, are non-overlapped with the through hole.

3. The portable electronic apparatus of claim 1, wherein a vertical projection of each of the buttons projected along a stacking direction of the keyboard component and the slidable structure on a surface of the base plate, are overlapped with at least part of the through hole.

4. The portable electronic apparatus of claim 1, wherein the base plate has a plurality of the through holes, and each of the buttons is corresponded with one of the through holes.

5. The portable electronic apparatus of claim 4, wherein a vertical projection of each of the buttons projected along a stacking direction of the keyboard component and the slidable structure on a surface of the base plate, are overlapped with at least part of a corresponded one of the through holes.

6. The portable electronic apparatus of claim 4, wherein the slidable structure comprises a plurality of the first protruding portions, each of the first protruding portions is accessed into a corresponded one of the through holes, and the first protruding portions are configured to contact with one of the buttons corresponded with the corresponded one of the through holes.

7. The portable electronic apparatus of claim 6, wherein each of the buttons comprises a second protruding portion, disposed on a surface of the button facing toward the slidable structure.

8. The portable electronic apparatus of claim 7, wherein when the slidable structure slides away from the pivotally-connected portion, the second protruding portion is abutted against the first protruding portion, and relatively slides along a surface of the first protruding portion, subsequently, the second protruding portion drives the buttons moved away from the slidable structure along a stacking direction of the keyboard component and the slidable structure.

9. The portable electronic apparatus of claim 7, wherein when the first protruding portion is accessed into the corresponded one of the through hole, the first protruding portion is abutted against the second protruding portion.

10. The portable electronic apparatus of claim 1, further comprising a stopper portion, disposed on the keyboard component, the stopper portion has a plurality openings, and when the keyboard component is moved away from the base, each of the buttons is protruded outside the stopper portion from one of the openings.

* * * * *